United States Patent
Ayers et al.

(10) Patent No.: US 11,332,386 B2
(45) Date of Patent: May 17, 2022

(54) WELL WASTEWATER TREATMENT

(71) Applicant: Aquamare, LLC, Oklahoma City, OK (US)

(72) Inventors: Steven Authray Ayers, Oklahoma City, OK (US); Ron L. Mayo, Fort Worth, TX (US); Kevin Parker Murphree, Norman, OK (US); Warren Russell Peacock, Oklahoma City, OK (US)

(73) Assignee: Aquamare, LLC, Oklahoma City, OK (US)

( * ) Notice: Subject to any disclaimer, the term of this patent is extended or adjusted under 35 U.S.C. 154(b) by 196 days.

(21) Appl. No.: 16/272,909

(22) Filed: Feb. 11, 2019

(65) Prior Publication Data

US 2019/0248676 A1    Aug. 15, 2019

Related U.S. Application Data (60) Provisional application No. 62/628,357, filed on Feb. 9, 2018.

(51) Int. Cl.
*C02F 1/24*   (2006.01)
*C02F 1/72*   (2006.01)
(Continued)

(52) U.S. Cl.
CPC ............ *C02F 1/24* (2013.01); *C02F 1/52* (2013.01); *C02F 1/722* (2013.01); *C02F 9/00* (2013.01);
(Continued)

(58) Field of Classification Search
CPC .... C02F 1/24; C02F 1/52; C02F 1/722; C02F 1/048; C02F 1/48; C02F 1/461;
(Continued)

(56) References Cited

U.S. PATENT DOCUMENTS 2,703,646 A   3/1955  Schoeld
5,783,084 A   7/1998  Suenkonis
(Continued)

FOREIGN PATENT DOCUMENTS

CA      2841633       8/2015
WO   2004050567 A1    6/2004

OTHER PUBLICATIONS

International Search Report and Written Opinion of the International Searching Authority dated Jun. 3, 2019 issued in corresponding PCT Application No. PCT/US2019/17543.

*Primary Examiner* — Akash K Varma
(74) *Attorney, Agent, or Firm* — McAfee & Taft (57) ABSTRACT

A process for continuously treating a stream of water (for example, a stream of oil and gas well wastewater) to remove contaminants therefrom is provided. The process comprises: a) testing the stream of water to determine if it contains biological matter and, if necessary, removing biological matter from the stream; b) testing the pH level of the stream and, if necessary, adjusting the pH level of the stream; c) separating the stream of water into a sludge discharge stream and a separator unit effluent stream; d) separating the separator unit effluent stream into a steam discharge stream and a concentrated brine stream; and e) separating the concentrated brine stream into a chlorine gas stream and at least one of a sodium stream and a calcium stream. A corresponding system is also provided.

24 Claims, 2 Drawing Sheets

(51) Int. Cl.
*C02F 1/52* (2006.01)
*C02F 9/00* (2006.01)
*C02F 101/12* (2006.01)
*C02F 103/10* (2006.01)
*C02F 1/04* (2006.01)
*C02F 101/32* (2006.01)
*C02F 1/78* (2006.01)
*C02F 101/20* (2006.01)
*C02F 1/56* (2006.01)
*C02F 1/66* (2006.01)
*C02F 103/36* (2006.01)
*C02F 1/461* (2006.01)

(52) U.S. Cl.
CPC ............. *C02F 1/048* (2013.01); *C02F 1/461* (2013.01); *C02F 1/56* (2013.01); *C02F 1/66* (2013.01); *C02F 1/78* (2013.01); *C02F 2001/5218* (2013.01); *C02F 2101/12* (2013.01); *C02F 2101/20* (2013.01); *C02F 2101/32* (2013.01); *C02F 2103/10* (2013.01); *C02F 2103/365* (2013.01); *C02F 2209/001* (2013.01); *C02F 2209/06* (2013.01); *C02F 2209/08* (2013.01); *C02F 2303/12* (2013.01)

(58) Field of Classification Search
CPC ...... C02F 1/56; C02F 1/66; C02F 1/78; C02F 1/72; C02F 1/00; C02F 1/04; C02F 3/00; C02F 9/00; C02F 2001/5218; C02F 2101/12; C02F 2101/20; C02F 2101/32; C02F 2103/10; C02F 2103/365; C02F 2209/001; C02F 2209/06; C02F 2209/08; C02F 2303/12; C02F 1/001; C02F 1/20; C02F 1/26; C02F 1/32; C02F 1/40; C02F 1/42; C02F 1/444; C02F 1/4618; C02F 1/4674; C02F 1/5245; C02F 1/725; C02F 1/74; C02F 1/5254; C02F 3/02; C02F 3/1294; C02F 2001/425; C02F 2103/22; C02F 2103/322; C02F 11/127; B01D 9/0018; B03D 1/14; C10B 49/16; C10B 53/02; C10B 57/08; C10C 5/00; C10G 1/00; C10G 1/02; C10G 2300/1014; C10G 2300/203; C10G 2300/44; C10L 1/02; C10L 9/02; Y02E 50/10; Y02P 30/20; Y02W 10/10
USPC ......................................................... 210/704
See application file for complete search history.

(56) References Cited

U.S. PATENT DOCUMENTS

| | | | |
|---|---|---|---|
| 6,534,550 B1* | 3/2003 | Walterick, Jr. | D21H 21/12 |
| | | | 162/158 |
| 8,252,183 B1 | 8/2012 | Massingill et al. | |
| 8,466,257 B2 | 6/2013 | Young et al. | |
| 9,056,784 B2 | 6/2015 | Pandya | |
| 9,499,413 B2 | 11/2016 | Schmidt | |
| 9,822,023 B1 | 11/2017 | Booth et al. | |
| 2005/0247639 A1* | 11/2005 | Harmon | C02F 3/02 |
| | | | 210/703 |
| 2006/0237693 A1* | 10/2006 | O'Hara | H01M 4/9083 |
| | | | 252/500 |
| 2010/0219372 A1* | 9/2010 | Hook | C01D 3/16 |
| | | | 252/182.32 |
| 2013/0140230 A1* | 6/2013 | Ott | C02F 3/32 |
| | | | 210/602 |
| 2013/0313199 A1* | 11/2013 | Marcin | C02F 9/00 |
| | | | 210/663 |
| 2015/0345278 A1 | 12/2015 | Schooley et al. | |

* cited by examiner

FIG. 1A

WELL WASTEWATER TREATMENT

CROSS-REFERENCE TO RELATED APPLICATION

This application claims the benefit of prior-filed U.S. provisional application No. 62/628,357 (filed on Feb. 9, 2018), which is incorporated by reference herein.

BACKGROUND

An oil and gas well is created by drilling a wellbore on a desired surface site (the "well site") that extends from the surface to a certain depth or distance into the ground. The wellbore penetrates the underlying earth and various subterranean formations therein. The wellbore can extend vertically, at an angle and/or horizontally through the earth.

As the wellbore is being drilled, a drilling fluid, also referred to as drilling mud, is continuously circulated from the surface through the wellbore and back to the surface. The drilling fluid functions to remove cuttings from the borehole, control formation pressure, and cool and lubricate the drill bit. After the wellbore is drilled to a certain or target depth, casing (typically metallic casing) is usually inserted and cemented in place in the now completed wellbore. The casing typically extends to the total depth of the wellbore. The casing isolates and seals off various formations that have been penetrated by the wellbore and serves multiple other purposes. Cement material is usually injected around the casing and allowed to harden into an annular sheath around the casing. The cement sheath physically supports, positions and protects the casing in the wellbore and bonds the casing to the walls of the wellbore such that the undesirable migration of fluids between zones or formations penetrated by the wellbore is prevented.

After the wellbore is drilled to the desired depth and cased, the well is ready for the final completion and production phases. Final completion of the well includes the creation of one or more access conduits (for example, perforations) that extend through the casing and cement sheath to provide communication between the wellbore and one or more of the subterranean formations (for example, natural gas or oil reservoirs) from which hydrocarbons are to be produced. The casing and cement sheath provide a solid support for the access conduits.

Various steps can be carried out in connection with completing the well. For example, stimulation (for example, acidizing and/or hydraulic fracturing) treatments can be carried out to increase the flow of hydrocarbons from the formation to the wellbore. Once the well is completed, the gas and/or fluids, which may include hydrocarbons and water, are produced or allowed to flow from the now completed subterranean formations into the wellbore and then to the surface where they are processed for future use.

For example, hydraulic fracturing can be used to increase the conductivity of a subterranean formation to thereby stimulate production of hydrocarbons from the formation. Hydraulic fracturing generally involves pumping one or more fracturing fluids into the formation at a sufficient hydraulic pressure to create or enhance one or more fractures in the formation. Thereafter, a slurry of proppant particulates (a "proppant slurry") is injected into the formation. The proppant slurry places the proppant particulates in the fracture in order to prevent the fracture from fully closing once the hydraulic pressure created by the fluid is released and the fracturing operation is complete. The resulting propped fracture provides one or more conductive channels through which fluids in the formation can flow from the formation to the wellbore.

The production of oil and/or other hydrocarbons from a subterranean oil reservoir can entail multiple stages, including a primary production stage and a secondary production stage. In the primary production stage, also known as primary recovery, hydrocarbons are caused to flow into the wellbore and to the surface for recovery by natural forces in the reservoir and/or the use of an artificial lift system (such as a rod pump or a submersible pump). For example, the primary production stage lasts until the reservoir pressure becomes so low that hydrocarbons cannot be economically produced from the well. For example, the primary production stage may yield only about 5% to about 15% of oil in an oil reservoir.

In order to economically produce more hydrocarbons from the well, a secondary production stage, also known as secondary recovery, is often implemented. A commonly used secondary recovery operation is secondary flooding.

Secondary flooding is used to drive hydrocarbons from a subterranean formation to the wellbore. In a secondary flooding operation, an injection fluid such as water or gas (the "injectant") is injected into the reservoir through one or more injection wells that are in fluid communication with one or more production wells in the reservoir. The injectant increases the pressure in the reservoir and drives hydrocarbons in the reservoir toward one or more of the production wells therein. For example, the secondary production stage typically lasts until the injectant is produced through the production well(s) in an amount such that production of hydrocarbons from the reservoir is no longer economical. For example, a secondary flooding technique can allow an additional 15% to 50% of the original oil in the reservoir to be recovered.

Even after a secondary recovery operation is carried out, significant hydrocarbons may still remain in the reservoir. As a result, in order to further increase the recovery of hydrocarbons from the reservoir, tertiary and even additional recovery operations are often carried out. In a tertiary flooding operation, for example, another injectant (for example, a fluid that is miscible or partially miscible with the oil in the reservoir) is injected into the reservoir through the injection well(s) in order to drive more oil from the reservoir to one or more production wells.

Throughout drilling, cementing, completion, production and secondary recovery operations in connection with an oil and gas well, a great deal of water is typically produced or otherwise recovered (hereafter "produced") from the well. For example, with the increasing use of fracturing technology to recover oil from shale and other types of formations, the amount of water being produced from oil and gas wells has substantially increased over the years.

Water produced from oil and gas wells (hereafter referred to herein as "well wastewater") generally has a high salt content and includes various chemicals and heavy metals. As a result, the wastewater cannot be merely discharged into area lakes and streams or otherwise into the environment. It must either be treated prior to disposal or otherwise disposed of in a safe and environmentally friendly manner.

Due to the high cost of treatment and other factors, wastewater is often injected back into the Earth through deep injection wells that extend well below the water table, often called brine or salt water disposal wells (hereafter referred to herein as "salt water disposal wells"). Salt water disposal wells are cased, and the wastewater is sent thousands of feet below the surface, usually to a sandstone or limestone formation. This type of disposal method has been considered safe over the years.

However, in recent years, the injection of high volumes of wastewater through salt water disposal wells has been linked to an increase in earthquakes in some states. This has resulted in increased regulation of salt water disposal wells. Although the link between disposal of wastewater through salt water disposal wells and earthquakes has been controversial, there is a need for improved and more economical wastewater treatment processes so that the need to dispose of high volumes of wastewater through salt water injection wells can be decreased.

SUMMARY OF THE DISCLOSURE

In one aspect, the present disclosure includes a process for continuously treating a stream of water to remove contaminants therefrom. The process comprises:

a) testing the stream of water to determine if it contains biological matter in an amount above a predetermined biological matter level and, if it is determined that the stream contains biological matter in an amount above the predetermined biological matter level, removing a sufficient amount of biological matter from the stream to cause the amount of biological matter in the stream to fall to a level at or below the predetermined biological matter level;

b) testing the pH level of the stream of water to determine if it falls within a predetermined pH range and, if it is determined that pH level of the stream does not fall within the predetermined pH range, adjusting the pH level of the stream to fall within the predetermined pH range;

c) after step a) and step b), separating the stream of water into a sludge discharge stream and a separator unit effluent stream, wherein the separator effluent stream includes at least one salt;

d) after step c), separating the separator unit effluent stream into a steam discharge stream and a concentrated brine stream, wherein the steam discharge stream includes water, and the concentrated brine stream includes at least one salt selected from the group of calcium chloride, sodium chloride, and combinations thereof; and e) after step d), separating the concentrated brine stream into a chlorine gas stream and at least one of a sodium stream and a calcium stream, wherein the chlorine gas stream includes chlorine, the sodium stream includes sodium and the calcium stream includes calcium.

In one sub-embodiment, the process disclosed herein is a process for continuously treating a stream of well wastewater to remove contaminants therefrom. In this sub-embodiment, the sludge discharge stream separated from the stream of wastewater in the sludge separator unit includes at least one hydrocarbon.

In another aspect, the present disclosure provides a system for continuously treating a stream of well wastewater to remove contaminants therefrom. The system comprises:

a BOD testing unit;
a biological matter separator unit;
a pH level testing unit;
a pH modifier feed station;
a sludge separator unit for separating a stream of water into a sludge discharge stream and a separator unit effluent stream, wherein the separator unit effluent stream includes at least one salt;
a crystallizer evaporator unit for separating the separator unit effluent stream into a steam discharge stream and a concentrated brine stream, wherein the concentrated brine stream includes at least one salt selected from the group of calcium chloride, sodium chloride, and combinations thereof; and a molten brine electrolysis unit for separating the concentrated brine stream into a chlorine gas stream and at least one of a sodium stream and a calcium stream.

In one sub-embodiment, the system disclosed herein is a system for continuously treating a stream of well wastewater to remove contaminants therefrom. In this sub-embodiment, the sludge discharge stream separated from the stream of wastewater in the sludge separator unit includes at least one hydrocarbon.

BRIEF DESCRIPTION OF THE DRAWINGS

The drawings included with this application illustrate a one sub-embodiment of one embodiment of the process and system described herein. However, the drawings should not be viewed as illustrating an exclusive sub-embodiment or embodiment of the process and system described herein. The subject matter disclosed is capable of considerable modifications, alterations, combinations, and equivalents in form and function, as will occur to those skilled in the art with the benefit of this disclosure.

FIG. 1 (collectively FIGS. 1A and 1B) is a flow diagram illustrating one sub-embodiment of a process for continuously treating a stream of well wastewater to remove contaminants therefrom, and one sub-embodiment of a system for continuously treating a stream of well wastewater to remove contaminants therefrom, as disclosed herein.

DETAILED DESCRIPTION

The present disclosure may be understood more readily by reference to this detailed description. Numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

As used herein and in the appended claims, a component that "comprises" or "includes" one or more specified compounds means that the component includes the specified compound(s) alone, or includes the specified compound(s) together with one or more additional compounds. A component that "consists of" one or more specified compounds means that the component includes only the specified compound(s). A component that "consists essentially of" one or more specified compounds means that the component consists of the specified compound(s) alone, or consists of the specified compound(s) together with one or more additional compounds that do not materially affect the basic properties of the component.

Whenever a range is disclosed herein, the range includes independently and separately every member of the range extending between any two numbers enumerated within the range. Furthermore, the lowest and highest numbers of any range shall be understood to be included within the range set forth.

In one aspect, this disclosure provides a process for continuously treating a stream of water to remove contaminants therefrom. In another aspect, this disclosure provides a system for continuously treating a stream of water to remove contaminants therefrom. The process disclosed herein can be carried out using the system disclosed herein, and the system disclosed herein can be used to carry out the process disclosed herein.

For example, the stream of water treated by the process and system disclosed herein can include surface water, ground water, treatment water, wastewater and combinations thereof. The stream of water can include fresh water, brackish water, and/or salt water. The water can include salts, hydrocarbons, heavy metals, toxic compounds, volatile compounds, biological matter and/or other contaminants. As used herein and in the appended claims, "biological matter" means bacteria, viruses, microorganisms, and algae. For example, the biological matter can come from human or animal waste.

The process and system disclosed herein can be used to continuously treat streams of water that come from various sources, including, for example, water produced from oil and gas wells (including produced water and flowback water), saline water from aquifers, agricultural surface water, and wastewater generated in refineries, chemical plants and other facilities. For example, in one embodiment, as described below, each of the process and system disclosed herein can be used to treat well wastewater.

The process disclosed herein for continuously treating a stream of water to remove contaminants therefrom comprises:

a) testing the stream of water to determine if it contains biological matter in an amount above a predetermined biological matter level and, if it is determined that the stream contains biological matter in an amount above the predetermined biological matter level, removing a sufficient amount of biological matter from the stream to cause the amount of biological matter in the stream to fall to a level at or below the predetermined biological matter level;

b) testing the pH level of the stream of water to determine if it falls within a predetermined pH range and, if it is determined that pH level of the water does not fall within the predetermined pH range, adjusting the pH level of the stream to fall within the predetermined range;

c) after step a) and step b), separating the stream of water into a sludge discharge stream and a separator unit effluent stream, wherein the separator effluent stream includes at least one salt;

d) after step c), separating the separator unit effluent stream into a steam discharge stream and a concentrated brine stream, wherein the steam discharge stream includes water, and the concentrated brine stream includes at least one salt selected from the group of calcium chloride, sodium chloride, and combinations thereof; and e) after step d), separating the concentrated brine stream into a chlorine gas stream and at least one of a sodium stream and a calcium stream, wherein the chlorine gas stream includes chlorine, the sodium stream includes sodium and the calcium stream includes calcium.

For example, the stream of water can be tested to determine if it contains biological matter in an amount above the predetermined biological matter level by testing the biological oxygen demand (the "BOD") of the stream. The BOD of the stream corresponds to the level of biological matter in the stream. Thus, a predetermined BOD level that corresponds to the predetermined biological matter can be used as the predetermined biological matter level.

Generally, the BOD is the amount of dissolved oxygen needed (consumed) by aerobic biological organisms to break down the organic matter present in a water sample at a certain temperature over a specific period of time. The BOD value is most commonly expressed in milligrams (mg) of oxygen consumed per liter of sample during 5 days of incubation at 20° C. and is often used to reference the degree of organic pollution of water. For example, when the BOD level is relatively high, the dissolved oxygen level in the sample is relatively low because the oxygen in the water is being consumed by the biological matter. As a result, the amount of biological matter in the stream of water can be quantified by the BOD of the stream.

The BOD of the stream of water can be tested by various methods known to those skilled in the art with the benefit of this disclosure. For example, the dissolved oxygen in and the temperature of the stream of water can be measured with a dissolved oxygen meter and probe. The probe can be inserted into the steam of water (for example, into process influent piping). The dissolved oxygen and temperature can then be used to calculate or estimate the BOD of the stream. A BOD testing unit can be used to carry out the test. The BOD of the stream can also be tested or confirmed by standard methods laboratory analysis and testing.

The BOD of the stream of water can be tested continuously or periodically out as the process is carried out. For example, the predetermined BOD level can be 10 milligrams (mg) per liter (L). For example, the predetermined BOD level can be 5 milligrams (mg) per liter (L). For example, the predetermined BOD level can be 1 milligram (mg) per liter (L). For example, the predetermined BOD level can be 0.1 milligram (mg) per liter (L). For example, the predetermined BOD level can be 0.01 milligram (mg) per liter (L). For example, the predetermined BOD level can be 0 milligrams (mg) per liter (L).

If it is determined that the stream of water contains biological matter in an amount above the predetermined biological matter level, a sufficient amount of biological matter can be removed from the stream to cause the amount of biological matter in the stream to fall to a level at or below the predetermined biological matter level using a biological matter separator unit. For example, the biological matter separator unit can separate biological matter from the stream by chemical coagulation and/or mechanical separation techniques. For example, the biological matter separator unit can be a diffused air flotation unit. For example, if the biological matter is not removed, it can make the stream of water septic.

The pH level of the stream of water can be tested to determine if it falls within a predetermined pH range by using conventional pH sensors, meters and probes. Alternatively, a more precise pH testing methodology and equipment can be used. For example, the pH level of the stream of water can be tested to determine if it falls within the predetermined pH range by testing the electrokinetic potential of the stream. The test can be continuously or periodically carried out as the process is carried out.

If it is determined that the pH level of the water does not fall within the predetermined pH range, the pH level of the stream can be adjusted to fall within the predetermined pH range by adding one or more pH modifying agents thereto. Examples of pH modifying agents that can be used include compounds having hydroxyl groups, compounds having carbonyl groups, aldehydes, and combinations thereof. For example, the predetermined pH range can be in the range of from about 4 to about 10. For example, the predetermined pH range can be in the range of from about 6 to about 9. For example, the predetermined pH range can be in the range of from about 6 to about 8.

In accordance with the process disclosed herein, it can be important to avoid "over-adjusting" the pH of the stream of water. For example, adding too much of a pH modifying agent to adjust the pH of the stream can adversely impact the process on down the line. As a result, it is important to accurately measure the pH of the stream. Also, it is important to make sure that the amount of pH modifying agent(s) added to the stream is not too high.

First, relatively precise pH testing methodology and equipment can be used. For example, as referenced above, the electrokinetic potential of the stream can be determined to calculate a more precise pH value.

Also, the type(s) and amount(s) of pH modifying agent(s) added to the stream of water to adjust the pH of the stream can be more accurately controlled. For example, in one embodiment, if it determined that pH level of the stream does not fall within the predetermined pH range, the process disclosed herein can further comprise the step of determining a specific pH modifying agent and a specific amount thereof that will cause the pH level of the stream to fall within the predetermined pH range. The pH level can then be adjusted to fall within the predetermined range by adding the specific pH modifying agent and the specific amount thereof to the stream. As used herein and in the appended claims, a specific pH modifying agent means a specific, single pH modifying agent capable of modifying the pH of the stream of water, or two or more specific pH modifying agents that are capable of collectively modifying the pH of the stream of water. In addition to assuring that the pH adjustment step does not adversely impact the process, more accurately controlling the type(s) and amount of pH modifying agent added to the stream of water also saves costs by minimizing the amount chemicals utilized.

The steps of determining a specific pH modifying agent and a specific amount thereof that will cause the pH level of the stream to fall within the predetermined pH range and adjusting the pH to fall within the predetermined range can be continuously carried out, for example, using a feedback loop pH controller. Electronic valance particle charge is converted into a feedback algorithm using square root extraction. The values are continually feed into the electronic controller.

The stream of water can be separated into a sludge discharge stream and a separator unit effluent stream in accordance with step c) of the process disclosed herein with a sludge separator unit. For example, the sludge separator unit functions to separate the stream of water into a sludge discharge stream and a separator unit effluent stream by solids separation techniques. For example, the sludge separator unit can be a diffused air flotation separator.

The separator unit effluent stream can be separated into a steam discharge stream and a concentrated brine stream in accordance with step d) of the process disclosed herein with an effluent stream separator unit. For example, the effluent stream separator unit functions to separate the separator unit effluent stream into a steam discharge stream and a concentrated brine stream by heat evaporation and condensation. For example, the effluent stream separator unit can be a crystal evaporator unit. For example, the crystal evaporator unit functions to separate the steam discharge stream from the separator unit effluent stream by the process of evaporation. The concentrated brine steam is separated from the separator unit effluent stream by a chemical solid-liquid separation technique in which mass transfer of solute from a liquid solution to a pure solid crystalline phase occurs.

The concentrated brine stream can be separated into a chlorine gas stream and at least one of a sodium stream and a calcium stream in accordance with step e) of the process disclosed herein with a brine separation unit. For example, the brine separation unit functions to separate the concentrated brine stream into a chlorine gas stream and at least one of a sodium stream and a calcium stream by ionic separation. For example, the brine stream separator unit can be a molten brine electrolysis unit.

In one embodiment, the process disclosed herein further comprises: prior to separating the stream of water into a sludge discharge stream and a separator unit effluent stream in accordance with step c) of the process disclosed herein, adding an oxidizing agent to the stream. As used herein and in the appended claims, an oxidizing agent means one or more oxidizers. For example, this step can be carried out after the stream passes through the biological matter separator unit if it is determined that the stream contains biological matter in an amount above the predetermined biological matter level, and before the pH level of the stream is tested. For example, the oxidizing agent can selected from the group of permanganates, ozone, hydrogen peroxide and combinations thereof. For example, the oxidizing agent can be hydrogen peroxide. Adding an oxidizing agent such as hydrogen peroxide to the stream enhances the removal of iron by the sludge separator unit.

In one embodiment, the process disclosed herein further comprises: prior to separating the stream of water into a sludge discharge stream and a separator unit effluent stream in accordance with step c) of the process disclosed herein, adding a flocculation agent to the stream. As used herein and in the appended claims, a flocculation agent means one or more flocculation, agglomeration and/or coagulation agents. For example, this step can be carried out after the stream passes through the biological matter separator unit if it is determined that the stream contains biological matter in an amount above the predetermined biological matter level, and after the pH level of the stream is tested. For example, the flocculation agent can be selected from the group of one or more acids, one or more alcohols, one or more compounds having amino groups, and combinations thereof. The flocculation agent causes colloids or other particulates in the stream of water to come out of suspension in the water or otherwise flocculate, coagulate or agglomerate.

Additional additives can be added to the stream 12 as well.

In one embodiment, the process disclosed herein further comprises: prior to separating the separator unit effluent stream into a steam discharge stream and a concentrated brine stream in accordance with step d) of the process disclosed herein, adding an anti-foaming agent to the stream. As used herein and in the appended claims, an anti-foaming agent means one or more water defoamers that function to reduce and hinder the formation of foam in the stream. For example, the presence of a significant amount of foam can adversely impact the efficiency of the process on down the line. For example, the anti-foaming agent can be selected from the group of compounds having hydroxyl groups, compounds having carbonyl groups, aldehydes, and combinations thereof.

In one embodiment of the process disclosed herein, the stream of water treated by the process is well wastewater. In this embodiment, the sludge discharge stream separated from the stream of wastewater in the sludge separator unit includes at least one hydrocarbon. As used herein and in the appended claims, "well wastewater" means water produced or otherwise recovered ("produced") from a well. A "well" means a wellbore extending into the ground and any subterranean formation(s) penetrated by the wellbore. For example, a well can be an oil well, a natural gas well, a water well or any combination thereof. For example, the well wastewater can be produced in connection with any type of operation carried out on a well, including drilling, cementing, completion, production, secondary recovery operations, and tertiary recovery operations as such operations are understood by those skilled in the art. For example, the well wastewater can be produced water or flowback water.

For example, in a sub-embodiment, the process disclosed herein is a process for continuously treating a stream of well wastewater to remove contaminants therefrom, comprising:

a) testing the stream of wastewater to determine if it contains a BOD above a predetermined BOD level and, if it is determined that the wastewater stream contains a BOD above the predetermined BOD level, removing a sufficient amount of biological matter from the stream to cause the BOD of the stream to fall to a level at or below the predetermined BOD level;

b) testing the pH level of the stream of wastewater to determine if it falls within a predetermined pH range and, if it is determined that pH level of the stream does not fall within the predetermined pH range, determining a specific pH modifying agent and a specific amount thereof that will cause the pH level of the stream to fall within the predetermined pH range, and adding the specific pH modifying agent and the specific amount thereof to the stream to adjust the pH level of the stream to fall within the predetermined pH range;

c) after step a) and step b), separating the stream of water into a sludge discharge stream and a separator unit effluent stream, wherein the sludge discharge stream includes at least one hydrocarbon, and the separator effluent stream includes at least one salt;

d) after step c), separating the separator unit effluent stream into a steam discharge stream and a concentrated brine stream, wherein the steam discharge stream includes water, and the concentrated brine stream includes at least one salt selected from the group of calcium chloride, sodium chloride, and combinations thereof; and e) after step d), separating the concentrated brine stream into a chlorine gas stream and at least one of a sodium stream and a calcium stream, wherein the chlorine gas stream includes chlorine, the sodium stream includes sodium and the calcium stream includes calcium.

The system disclosed herein for continuously treating a stream of water to remove contaminants therefrom comprises:

a BOD testing unit;
a biological matter separator unit;
a pH level testing unit;
a pH adjustment station;
a sludge separator unit for separating a stream of well wastewater into a waste sludge effluent stream and a separator effluent stream, wherein the separator unit effluent stream includes at least one salt;
a crystallizer evaporator unit for separating the separator unit effluent stream into a steam discharge stream and a concentrated brine stream, wherein the concentrated brine stream includes at least one salt selected from the group of calcium chloride, sodium chloride, and combinations thereof; and
a molten brine electrolysis unit for separating the concentrated brine stream into a chlorine gas stream and at least one of a sodium stream and a calcium stream.

For example, the BOD testing unit can include a dissolved oxygen meter and probe, as discussed above.

For example, the biological matter separator unit can be a diffused air flotation separator. The diffused air flotation separator functions to remove biological matter from the stream of water by attaching dissolved air to the coagulated biological particles.

For example, the pH level testing unit can be a feedback loop pH controller, including a pH probe, as discussed above. A pH algorithm is fed to an electronic controller. For example, the pH level testing unit is capable of testing the electrokinetic potential of the stream of water. For example, the pH level testing unit is also capable of determining a specific pH modifying agent and a specific amount thereof that will cause the pH level of the stream to fall within the predetermined pH range.

For example, the pH adjustment station can be a chemical feed unit that automatically introduces the specific pH modifying agent in the specific amount thereof, as determined by the pH level testing unit, into the stream of water.

The sludge separator unit 24 separates the wastewater stream 12 waste into a sludge discharge stream that includes suspended matter such as hydrocarbons (e.g., free oil) and solid materials (for example, salts), and a separator unit effluent stream that includes at least one salt. For example, the sludge separator unit 24 functions by separating dissolved salt particles from coagulated hydrocarbons. For example, the sludge separator unit can be a diffused air flotation separator.

For example, the crystal evaporator unit functions to separate the separator unit effluent stream into a steam discharge stream and a concentrated brine stream that includes at least one salt selected from the group of calcium chloride, sodium chloride, and combinations thereof by the process of evaporation and a chemical solid-liquid separation technique in which mass transfer of solute from a liquid solution to a pure solid crystalline phase occurs.

For example, the molten brine electrolysis unit functions to separate the concentrated brine stream into a chlorine gas stream and at least one of a sodium stream and a calcium stream by ionic separation.

In one embodiment, the system further comprises an oxidizing agent feed station. For example, the oxidizing agent feed station functions to automatically introduce an oxidizing agent into the stream of water.

In one embodiment, the system further comprises a flocculation agent feed station. For example, the flocculation agent feed station functions to automatically introduce a flocculation agent into the stream of water.

In one embodiment, the system further comprises an anti-foaming agent feed station. For example, the anti-foaming agent feed station functions to automatically introduce an anti-foaming agent into the stream of water.

In one embodiment, the system disclosed herein is a system for continuously treating a stream of well wastewater to remove contaminants therefrom. In this embodiment, the sludge effluent stream separated from the stream of wastewater in the sludge separator unit includes at least one hydrocarbon.

Figure 1A:
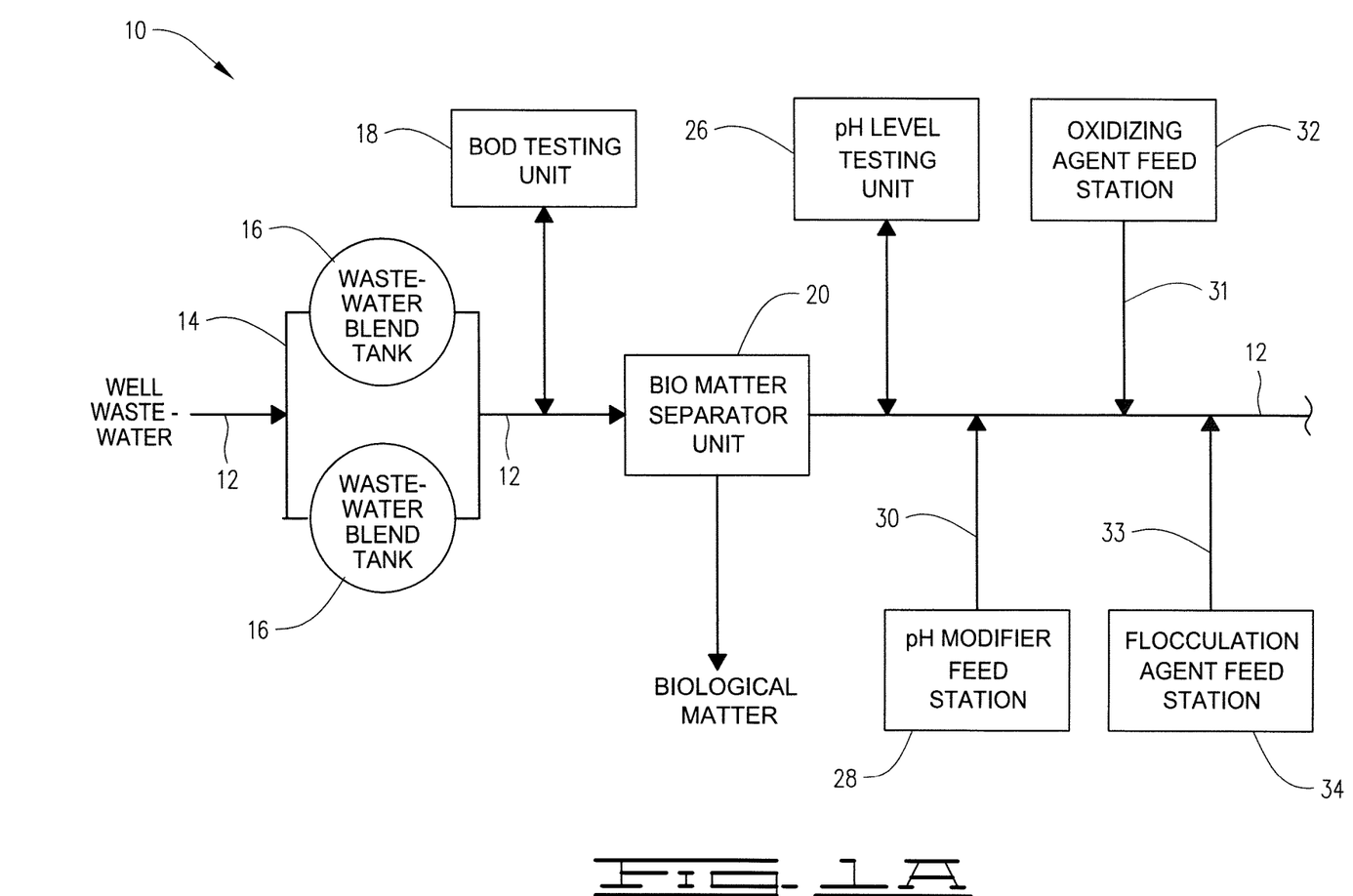
Figure 2:
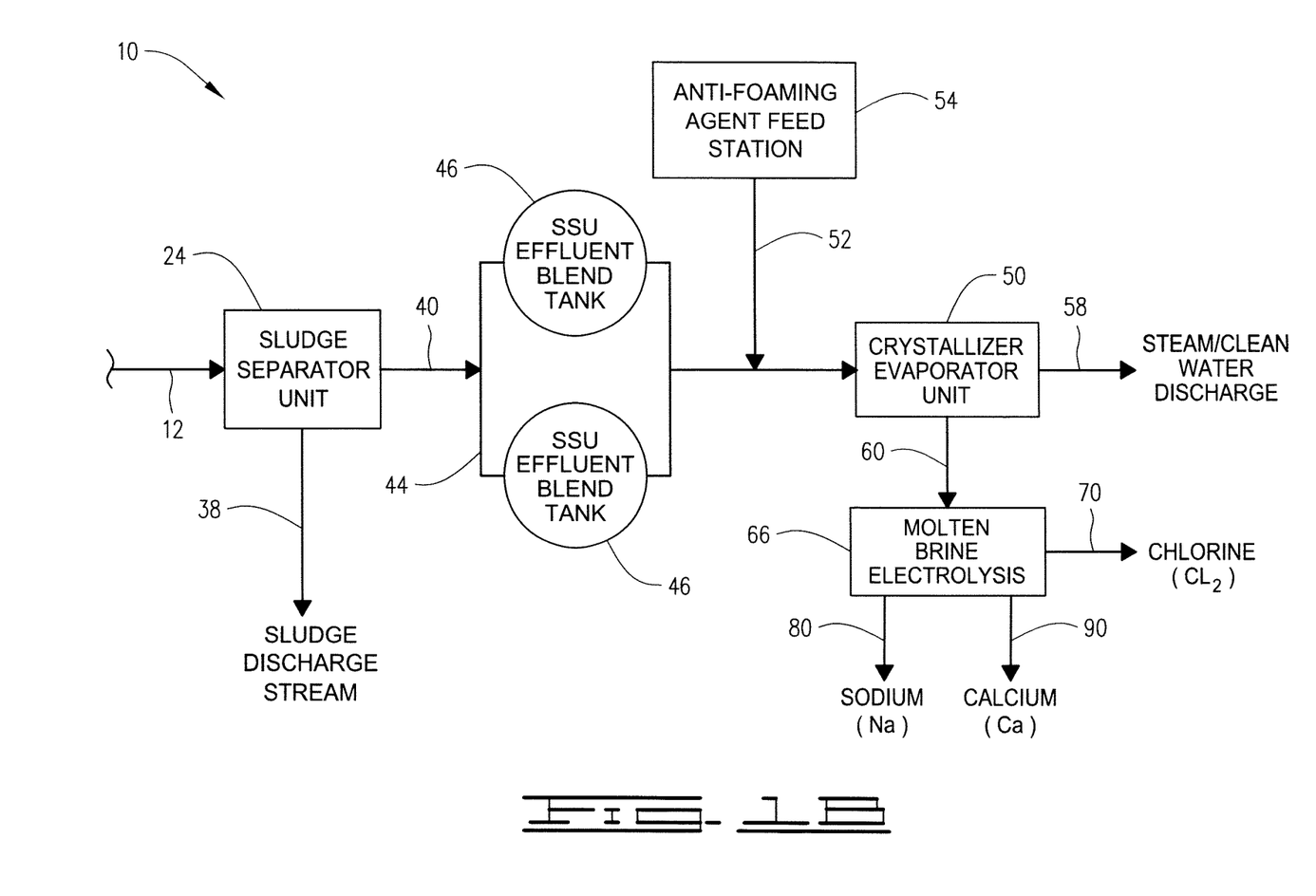

Referring now to FIGS. 1A and 1B, one embodiment of the process for continuously treating a stream of well wastewater to remove contaminants therefrom, and one embodiment of the system for continuously treating a stream of well wastewater to remove contaminants therefrom, both generally designated by the reference numeral 10, will be collectively described.

An incoming stream of raw (untreated) well wastewater 12 is conducted from the well head of a well (not shown) (for example, the wellhead of a production well) into a network 14 of wastewater blend tanks 16. The wastewater blend tanks 16 are used to maintain an inventory of well wastewater for treatment. For example, the stream of well wastewater 12 has a high salt content and includes hydrocarbons and heavy metals. For example, the well wastewater 12 may also contain biological matter and other contaminants.

Prior to or after the stream of well waste wastewater 12 is conducted from the well head into the network 14 of wastewater blend tanks 16, the stream is tested to determine if it contains a BOD above a predetermined BOD level. For example, this is done by setting a predetermined BOD level for the stream, and testing the BOD level of the stream by circulating the stream or a portion thereof through a BOD testing unit 18 to determine the BOD level of the stream and if it is above the predetermined BOD level. For example, the predetermined BOD level can be 1 mg/L.

If it is determined that the stream of wastewater stream 12 contains a BOD level above the predetermined BOD level, a sufficient amount of biological matter is removed from the stream to cause the BOD of the stream to fall to a level at or below the predetermined BOD level. For example, this is done by conducting the stream of wastewater from the network 14 of wastewater blend tanks 16 into a biological matter separator unit 20. The biological matter separator unit 20 separates biological matter from the stream to reduce the BOD level of the stream below the predetermined BOD level. For example, the biological matter separator unit 20 is a diffused air flotation unit.

The stream of well wastewater 12 is ultimately conducted from the network 14 of wastewater blend tanks 16 (or the biological matter separator unit 20 if necessary) into a sludge separator unit 24. However, before the stream 12 is introduced into the sludge separator unit 24, the pH of the stream is tested and adjusted, as necessary, to fall within a predetermined pH range, and one or more pH modifying agents and additional chemical compounds are added to the stream to pre-condition the stream for the remainder of the process.

For example, the pH level of the stream of wastewater 12 is tested to determine if it falls within a predetermined pH range. For example, this is done by setting a predetermined pH range for the stream, and testing the pH level of the stream by circulating the stream or a portion thereof through a pH level testing unit 26 to determine the pH level of the stream and if it falls within the predetermined pH range. For example, the predetermined pH range can be 6 to 9.

If it is determined that the pH level of the stream does not fall within the predetermined range, a specific pH modifying agent and a specific amount thereof that will cause the pH level of the stream to fall within the predetermined pH range are determined. The specific pH modifying agent and the specific amount thereof are then continuously added to the stream to continuously adjust the pH level of the stream to fall within the predetermined pH range. For example, if the pH level of the stream is 3, a specific concentrated sodium hydroxide solution may be continuously injected into the stream 12 at a specific rate to raise the pH of the stream to within the 6 to 9 range. If the pH level of the stream is 13, a specific concentrated hydrochloric acid solution may be continuously injected into the stream 12 at a specific rate to lower the pH of the stream to within the 6 to 9 range.

For example, the pH level testing unit 26 can determine the pH level of the stream by determining the electrokinetic potential of the stream and calculating the pH based thereon. Such a test methodology provides a relatively precise indication of the pH level of the stream. For example, a pH modifier feed station 28 is used to add the specific amount of a specific pH modifying agent 30 (e.g., one or more acids or bases) to the stream.

Next, a specific amount of an oxidizing agent 31, such as hydrogen peroxide, is added to the stream 12 from an oxidizing agent feed station 32 to enhance the removal of iron by the sludge separator unit 24. Also, a flocculation agent 33 is added to the stream 12 from a flocculation agent feed station 34 to cause colloids or other particulates in the wastewater to come out of suspension in the water or otherwise flocculate, coagulate or agglomerate.

Next, the wastewater stream 12 is conducted into the sludge separator unit 24, where it is separated into a sludge discharge stream 38 and a separator unit effluent stream 40. For example, the sludge separator unit 24 can be a diffused air flotation separator. For example, the sludge discharge stream 38 includes one or more hydrocarbons (for example, free oil), one or more salts, and other chemical contaminants from the wastewater stream 12. The sludge discharge stream 38 is discharged from the sludge separator unit 24, conducted to another location (for example, a tanker truck or storage facility), and ultimately recycled or disposed. The separator unit effluent stream 40 includes at least one salt and is further processed in accordance with the process 10. For example, the separator unit effluent stream 40 can include a high content of salts including calcium and sodium salts.

The separator unit effluent stream 40 is discharged from the sludge separator unit 24 and conducted to a network 44 of SSU effluent blend tanks 46. The SSU effluent blend tanks 46 are used to maintain an inventory of separator unit effluent for further treatment.

The separator unit effluent stream 40 is ultimately conducted from the network 44 of SSU effluent water blend tanks 46 into a crystallizer evaporator unit 50. However, before the separator unit effluent stream 40 is introduced into the crystallizer evaporator unit 50, an anti-foaming agent 52 from an anti-foaming agent chemical feed station 54 is added to the stream 40. For example, the anti-foaming agent reduces or eliminates foam that is generated later in the process, for example, in the crystallizer evaporator unit 50.

Next, the separator unit effluent stream 12 is conducted to and introduced into the crystal evaporator unit 50, where it is separated into a steam discharge stream 58 and a concentrated brine stream 60. For example, the steam discharge stream 58 includes steam which, upon being discharged from the crystal evaporator unit, can be condensed into clean water (for example, distilled water). For example, the concentrated brine stream 60 includes at least one salt selected from the group of calcium chloride, sodium chloride and combinations thereof.

Depending on local regulations, water condensed from the steam discharge stream 58 is typically clean enough to be discharged into area lakes and streams. The water condensed from the steam can also be discharged into one or more underground water aquifers to help recharge the aquifer(s). Alternatively, the water condensed from the steam can be re-used in connection with the process or the well.

Next, the highly concentrated brine stream 60 (for example, containing both sodium chloride and calcium chloride) is conducted to and introduced into a molten brine electrolysis unit 66, where it is separated into a chlorine gas ($Cl_2$) stream 70, and at least one of a sodium stream 80 and a calcium stream 90 by electrolysis. For example, the highly concentrated brine stream 60 can be separated in the molten brine electrolysis unit 66 into a chlorine gas stream 70, a sodium stream 80 and a calcium stream 90. The chlorine gas stream includes chlorine. The sodium stream includes the metal sodium, and the calcium stream includes the metal calcium. For example, metallic sodium and metallic calcium are produced from molten sodium chloride and molten calcium chloride, respectively. For example, liquid sodium and liquid calcium float to the top of the melts above a cathode and can be drained from the molten brine electrolysis unit 66. The chlorine gas bubbles out of the melts above the anode. The chlorine gas, sodium and calcium can be recycled for a variety of applications.

Many advantages are achieved by the process and system disclosed herein. The process and system remove the salt and other contaminants from the well wastewater in an efficient manner. Total suspended solids and total dissolved solids, including total volatile solids, can be effectively reduced. Salts and heavy metals can be removed. Fresh water can be returned for future use, for example, in drilling or completion or stimulation treatments, in connection with agricultural land use. Potential liability due to surface contamination and earthquakes can be reduced in some cases. Operational expenses, including disposal fees, trucking expenses and water acquisition costs can also be reduced.

A primary advantage is the flow and chemical platforms disclosed herein can achieve a contaminant removal system at an economically viable return. Another advantage, for example, is the distilled condensate produced can be utilized to recharge water aquifer depletion rates. Thus, oil and/or gas production wastewater can be processed into usable commodity components plus water suitable for aquifer recharge.

The system disclosed herein is mobile, thereby allowing the process disclosed herein to be carried out on the well site or in the general vicinity of one or more wells. The system has a relatively small footprint allowing it to be easily used at a well site. Exactly where the process is carried out with respect to a given well will depend on local regulations and permitting.

The system is site specific and can be designed and scaled to meet each operator's needs. The scale of the process and system will vary depending on how many wastewater feed wells are involved and the volume of wastewater to be processed. For example, the process and system are capable of treating volumes ranging from 5,000 to 150,000+ barrels per day.

For example, the equipment used in the process and system disclosed herein can be formed of a metal that is capable of rapid heating and cooling. This facilitates the mobility of the system. The equipment can also be modular in nature so that the equipment can be easily transported and assembled and disassembled.

EXAMPLE

The following example illustrates a specific embodiment consistent with the present disclosure but does not limit the scope of the disclosure or the appended claims. Concentrations and percentages are by weight unless otherwise indicated.

Water Sample Analysis

Raw wastewater was collected from a producing oil and gas well located in Cleveland County, Okla. The wastewater was transported to a pilot treatment facility in Noble, Okla., where the process disclosed herein was carried out to treat the samples. The samples were then analyzed by an independent certified lab in Oklahoma City, Okla. The results of the analysis are set forth in Table 1 below.

TABLE 1

| | | Water Sample Analysis (February 2018) | | | | |
|---|---|---|---|---|---|---|
| Sample Constituents | EPA Drinking Water Standards | Influent Feb. 14, 2018 | Effluent Feb. 14, 2018 | Effluent Feb. 15, 2018 | Effluent Feb. 21, 2018 | Effluent Feb. 21, 2018 |
| Alkalinity Biocarbonate (mg/l) | N/A | 6.00 | BPQL | BPQL | BPQL | BPQL |
| Carbon Dioxide (mg/l) | N/A | 139.00 | 74.20 | 76.60 | 82.70 | 91.50 |
| Alkalinity Carbonate (mg/l) | N/A | BPQL | BPQL | BPQL | BPQL | BPQL |
| Chloride (mg/l) | 250.00 | 135000 | 6.30 | 7.44 | 3.11 | 1.17 |
| Density (g/ml) | N/A | 1.17 | 1.010 | 1.011 | 1.018 | 0.994 |
| pH (pH Units) | 6.5-8.5 | 5.66 | 4.17 | 3.84 | 4.16 | 4.10 |
| Resistivity (ohms-cm) | 1000-5000 | 1.90 | 14000 | 11300 | 13700 | 15800 |
| Temperature (° C.) | N/A | 22.1 | 21.7 | 21.1 | 20.4 | 20.2 |
| Conductivity (umhos/cm) | Up to 800 | 502000 | 71.20 | 88.50 | 73.20 | 63.30 |
| Sulfate (mg/l) | 250.00 | 148 | BPQL | BPQL | BPQL | BPQL |
| Total Dissolved Solids (mg/l) | 500.00 | 270000 | BPQL | 42.00 | BPQL | BPQL |
| Barium (mg/l) | 2.00 | 30.80 | BPQL | BPQL | BPQL | BPQL |
| Calcium (mg/I) | 40-80 | 12500 | 0.57 | 0.78 | 0.31 | 0.17 |
| Magnesium (mg/l) | 20-30 | 2120 | BPQL | 0.14 | BPQL | BPQL |
| Manganese (mg/l) | 0.05 | 5.69 | 0.025 | BPQL | BPQL | BPQL |
| Sodium (mg/l) | 30-60 | 67600 | 2.53 | 4.96 | 1.29 | 1.07 |
| Strontium (mg/l) | 1.5 | 561 | 0.025 | 0.034 | BPQL | BPQL |
| Iron (mg/l) | 0.3 | 70.80 | 2.07 | 1.14 | 3.10 | 2.28 |

N/A-Not Available
BPQL-Below Particle Quantitative Limits

Referring to Table 1, the water samples are identified as being either influent (raw wastewater) or effluent (after the process disclosed herein was carried out to treat the samples). For example, the samples are identified as: 1) Influent Feb. 14, 2018; 2) Effluent Feb. 14, 2018; 3) Effluent Feb. 15, 2018; 4) Effluent Feb. 21, 2018; and 5) Effluent Feb. 21, 2018.

The EPA Drinking Water Standards are shown as a benchmark (for comparative purposes only). As shown, the process disclosed herein was used to successfully treat the samples to remove contaminants therefrom. For example, the concentrations of various salts and metals in the samples were substantially lowered.

Therefore, the present process and system are well adapted to attain the ends and advantages mentioned, as well as those that are inherent therein. The particular examples disclosed above are illustrative only, as the present process and system may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present process and system. While the present process and system and the individual steps and components thereof may be described in terms of "comprising," "containing," "having," or "including" various steps or components, the process and system can also, in some examples, "consist essentially of" or "consist of" the various steps and components. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A process for continuously treating a stream of water to remove contaminants therefrom, comprising:
   a) testing the stream of water to determine if it contains biological matter in an amount above a predetermined biological matter level and, if it is determined that the stream of water contains biological matter in the amount above said predetermined biological matter level, removing a sufficient amount of biological matter from the stream of water to cause the amount of biological matter in the stream of water to fall to a level at or below said predetermined biological matter level;
   b) testing a pH level of the stream of water to determine if it falls within a predetermined pH range and, if it is determined that the pH level of the stream of water does not fall within the predetermined pH range, adjusting the pH level of the stream of water to fall within said predetermined pH range;
   c) after step a) and step b), separating the stream of water into a sludge discharge stream and a separator unit effluent stream, wherein said separator unit effluent stream includes at least one salt;
   d) after step c), separating said separator unit effluent stream into a steam discharge stream and a concentrated brine stream, wherein said steam discharge stream includes water, and said concentrated brine stream includes at least one salt selected from the group of calcium chloride, sodium chloride, and combinations thereof; and
   e) after step d), separating said concentrated brine stream into a chlorine gas stream and at least one of a sodium stream and a calcium stream, wherein said chlorine gas stream includes chlorine, said sodium stream includes sodium and said calcium stream includes calcium.

2. The process of claim 1, wherein the stream of water is tested to determine if it contains biological matter in the amount above said predetermined biological matter level by testing a biological oxygen demand of the stream of water.

3. The process of claim 1, wherein if it is determined that the stream of water contains biological matter in the amount above said predetermined biological matter level, the sufficient amount of biological matter is removed from the stream of water using a biological matter separator unit.

4. The process of claim 3, wherein said biological matter separator unit is a diffused air flotation separator.

5. The process of claim 1, wherein the pH level of the stream of water is tested to determine if it falls within said predetermined pH range by testing an electrokinetic potential of the stream of water.

6. The process of claim 1, further comprising:
   if it is determined that the pH level of the stream of water does not fall within said predetermined pH range, determining a specific pH modifying agent and a specific amount of the specific pH modifying agent that will cause the pH level of the stream of water to fall within said predetermined pH range; and wherein the pH level of the stream of water is adjusted to fall within said predetermined pH range by adding said specific pH modifying agent and said specific amount of the specific pH modifying agent to the stream of water.

7. The process of claim 1, wherein the stream of water is separated into said sludge discharge stream and said separator unit effluent stream with a sludge separator unit.

8. The process of claim 7, wherein said sludge separator unit is a diffused air flotation separator.

9. The process of claim 1, wherein said separator unit effluent stream is separated into said steam discharge stream and said concentrated brine stream with a crystal evaporator unit.

10. The process of claim 1, wherein said concentrated brine stream is separated into said chlorine gas stream and at least one of said sodium stream and said calcium stream with a molten brine electrolysis unit.

11. The process of claim 1, further comprising: prior to separating the stream of water into said sludge discharge stream and said separator unit effluent stream, adding an oxidizing agent to the stream of water.

12. The process of claim 11, wherein said oxidizing agent is hydrogen peroxide.

13. The process of claim 1, further comprising: prior to separating the stream of water into said sludge discharge stream and said separator unit effluent stream, adding a flocculation agent to the stream of water.

14. The process of claim 1, further comprising: prior to separating said separator unit effluent stream into said steam discharge stream and said concentrated brine stream, adding an anti-foaming agent to the stream of water.

15. The process of claim 1, wherein said process is a process for continuously treating a stream of well wastewater to remove contaminants therefrom, and wherein said sludge discharge stream includes at least one hydrocarbon.

16. A process for continuously treating a stream of well wastewater to remove contaminants therefrom, comprising:
   a) testing the stream of well wastewater to determine if it contains a biological oxygen demand above a predetermined biological oxygen demand level and, if it is determined that the stream of well wastewater contains the biological oxygen demand above said predetermined biological oxygen demand level, removing a sufficient amount of biological matter from the stream of well wastewater to cause the biological oxygen demand of the stream of well wastewater to fall to a level at or below said predetermined biological oxygen demand level;

b) testing a pH level of the stream of well wastewater to determine if it falls within a predetermined pH range and, if it is determined that the pH level of the stream of well wastewater does not fall within said predetermined pH range, determining a specific pH modifying agent and a specific amount of the specific pH modifying agent that will cause the pH level of the stream of well wastewater to fall within said predetermined pH range, and adding said specific pH modifying agent and said specific amount of the specific pH modifying agent to the stream of well wastewater to adjust the pH level of the stream of well wastewater to fall within said predetermined pH range;

c) after step a) and step b), separating the stream of well wastewater into a sludge discharge stream and a separator unit effluent stream, wherein said sludge discharge stream includes at least one hydrocarbon, and said separator unit effluent stream includes at least one salt;

d) after step c), separating said separator unit effluent stream into a steam discharge stream and a concentrated brine stream, wherein said steam discharge stream includes water, and said concentrated brine stream includes at least one salt selected from the group of calcium chloride, sodium chloride, and combinations thereof; and e) after step d), separating said concentrated brine stream into a chlorine gas stream and at least one of a sodium stream and a calcium stream, wherein said chlorine gas stream includes chlorine, said sodium stream includes sodium and said calcium stream includes calcium.

17. The process of claim 16, wherein the pH level of the stream of well wastewater is tested to determine if it falls within said predetermined pH range by testing an electrokinetic potential of the stream of well wastewater.

18. The process of claim 16, wherein said biological matter is removed from said stream of well wastewater using a biological matter separator unit, wherein said biological matter separator unit is a diffused air flotation separator.

19. The process of claim 16, wherein the stream of well wastewater is separated into said sludge discharge stream and said separator unit effluent stream with a sludge separator unit, wherein said sludge separator unit is a diffused air flotation separator.

20. The process of claim 16, wherein said separator unit effluent stream is separated into said steam discharge stream and said concentrated brine stream with a crystal evaporator unit.

21. The process of claim 16, wherein said concentrated brine stream is separated into said chlorine gas stream and at least one of said sodium stream and said calcium stream with a molten brine electrolysis unit.

22. The process of claim 16, further comprising: prior to separating the stream of well wastewater into said sludge discharge stream and said separator unit effluent stream, adding an oxidizing agent to the stream of well wastewater.

23. The process of claim 16, further comprising: prior to separating the stream of well wastewater into said sludge discharge stream and said separator unit effluent stream, adding a flocculation agent to the stream of well wastewater.

24. The process of claim 16, further comprising: prior to separating said separator unit effluent stream into said steam discharge stream and said concentrated brine stream, adding an anti-foaming agent to the stream of well wastewater.

* * * * *